United States Patent [19]
Hijii

[11] Patent Number: 5,903,327
[45] Date of Patent: May 11, 1999

[54] LIQUID CRYSTAL DISPLAY UNIT AND ILLUMINATING CONTROL METHOD OF PICT DISPLAY SECTION OF SAID LIQUID CRYSTAL DISPLAY DEVICE

[75] Inventor: Kazuyoshi Hijii, Tokyo, Japan

[73] Assignee: NEC Corporation, Tokyo, Japan

[21] Appl. No.: 08/567,482

[22] Filed: Dec. 5, 1995

[30] Foreign Application Priority Data

Dec. 6, 1994 [JP] Japan .................................. 6-330092

[51] Int. Cl.$^6$ .................................................. G03F 1/33
[52] U.S. Cl. .............................. 349/73; 349/83; 349/142; 349/143; 349/149
[58] Field of Search .......................... 349/73, 83, 142, 349/143, 149

[56] References Cited

U.S. PATENT DOCUMENTS 4,764,766  8/1988  Aoyama et al. ...................... 349/142

FOREIGN PATENT DOCUMENTS 0588329  3/1994  European Pat. Off. .
0652460  5/1995  European Pat. Off. .
2134299  8/1984  United Kingdom .

Primary Examiner—William L. Sikes
Assistant Examiner—Julie Ngo
Attorney, Agent, or Firm—Sughrue, Mion, Zinn, Macpeak & Seas, PLLC

[57] ABSTRACT

A liquid crystal display unit having a dot matrix display section, a pict display section arranged at a different portion from the dot matrix display section and a connection terminal for connecting signal conductors from the dot matrix display section with an external device, wherein the pict display section is divided into a plurality of cells and the signal conductors are connected with the connection terminal via each of the cells.

13 Claims, 12 Drawing Sheets

LIQUID CRYSTAL DISPLAY UNIT AND ILLUMINATING CONTROL METHOD OF PICT DISPLAY SECTION OF SAID LIQUID CRYSTAL DISPLAY DEVICE

BACKGROUND OF THE INVENTION

The present invention relates to an Liquid Crystal Display (referred to as LCD, hereinafter) unit for illuminating characters and symbols by means of an LCD driver and, more particularly to an effective wiring art of signal conductors used in the LCD unit provided with a pict display section and a dot matrix display section, and an illuminating control method of the pict display section.

A conventional LCD unit has two types of display system, one is a pict display for displaying fixed characters, symbols and pictures and another is a dot matrix display where a plurality of cells are arranged in dot matrix and some cells are selected and illuminated to form a predetermined character by applying drive voltage to the selected cells. A certain model of the LCD unit has both the pict display section and the dot matrix display section.

FIG. 9 shows the LCD unit provided with both the dot matrix display section 31 and the pict display section 32 on its surface.

As FIG. 10 shows, signal conductors of those display sections, that is, the dot matrix display section 31 and the pict display section 32 comprise common signal conductors 1 to 15 connected to the row electrodes of the dot matrix display section 31 and the pict display section 32, and segment signal conductors 1 to 40 connected to the column electrodes of the dot matrix display section 31. These signal conductors elongate toward a connection terminal 33 for connecting an external device to the display sections 31 and 32, respectively.

With a conventional wiring of signal conductors, disposing the pict display section 32 between the dot matrix display section 31 and the connection terminal 33 as shown in FIG. 11 requires the segment signal conductors and common signal conductors connecting the dot matrix display section 31 and the connection terminal 33 to bypass the respective pict display sections 32. This results in very complicated wiring as a whole. Moreover in case the wiring space is limited, sufficient space for disposing the pict display section 32 between the dot matrix display section 31 and the connection terminal 33 cannot be obtained, thus restricting provision of the display section.

The Japanese Patent Application Laid-Open No. 31890 (1992) discloses a wiring method with decreased signal conductors as a whole by dividing a character string on one row of the dot matrix display section into a plurality of parts so that the segment signal conductor is shared by those divided parts of the character string.

In this art, as shown in FIG. 12, eight common signal conductors COMs 1 to 8 for a left half character string of the first row, eight common signal conductors COMs 9 to 16 for a right half character string of the first row, eight common signal conductors COMs 17 to 24 for a left half character string of the second row and eight common signal conductors COMs 25 to 32 for a right half character string of the second row are disposed. Segment signal conductors SEGs 1 to 50 for two left character strings of the first row and the second row, and the segment signal conductors SEGs 1 to 50 are shared by two right character strings of the first row and the second row. As a result, in case of displaying two rows (where a character with 5×8 dot matrix, 20 characters per a row), 32 lines of common signal conductors and 50 lines of segment signal conductors, totally 82 signal conductors are needed.

This invention has enabled to greatly reduce the number of necessary lines of signal conductors that has been 116 lines in a conventional art.

With this prior art, however, the wiring of signal conductors still requires to bypass the pict display section.

SUMMARY OF THE INVENTION

It is an object of the present invention to solve the above-described problems.

It is another object of the present invention to provide a signal conductor's wiring art, which does not limit arrangement of a pict display section, for a liquid crystal display unit and a control method for illuminating the pict display section.

The object of the present invention is achieved by a liquid crystal display unit having a dot matrix display section, a pict display section arranged at a different portion from the dot matrix display section and a connection terminal for connecting signal conductors from the dot matrix display section with an external device, the liquid crystal display unit comprising a pict display section divided into a plurality of cells, wherein the signal conductors are connected with the connection terminal via each of the cells.

Furthermore, the object of the present invention is achieved by a control method of illuminating a predetermined pict display section using a plurality of segment signal conductors and common signal conductors connected with a dot matrix display section in a liquid crystal display unit having a dot matrix display section and a plurality of pict display sections, the control method comprising steps of: dividing each of the plurality of pict display sections into a plurality of cells and connecting a segment signal conductor with a cell; connecting all cells with a common signal conductor; and driving cells of a predetermined pict display section by impressing the common signal conductor and all segment signal conductors connected with cells of the predetermined pict display section and illuminating the predetermined pict display section.

When disposing the pict display section between the dot matrix display section and the connection terminal, the above-constructed liquid crystal display unit causes each segment signal conductor or a common signal conductor to be connected to the divided pict parts (cells), respectively, from where each signal conductor elongates for connecting to the connection terminal without requiring to bypass the pict display section.

The pict display section is designed to be driven by a plurality of segment signal conductors passing through the respective divided pict parts and corresponded common signal conductor.

According to the present invention, the pict display section can be disposed between the dot matrix display section and the connection terminal so as to be in alignment with the signal conductor wiring for the dot matrix display section. Therefore, the LCD unit is provided with the pict display section and the dot matrix display section on the same display surface for effecting signal conductor wiring and providing a great degree of freedom in displaying.

BRIEF DESCRIPTION OF THE DRAWINGS

This and other objects, features and advantages of the present invention will become more apparent upon a reading of the following detailed description and drawings, in which.

DESCRIPTION OF THE PREFERRED EMBODIMENTS

Figure 1:
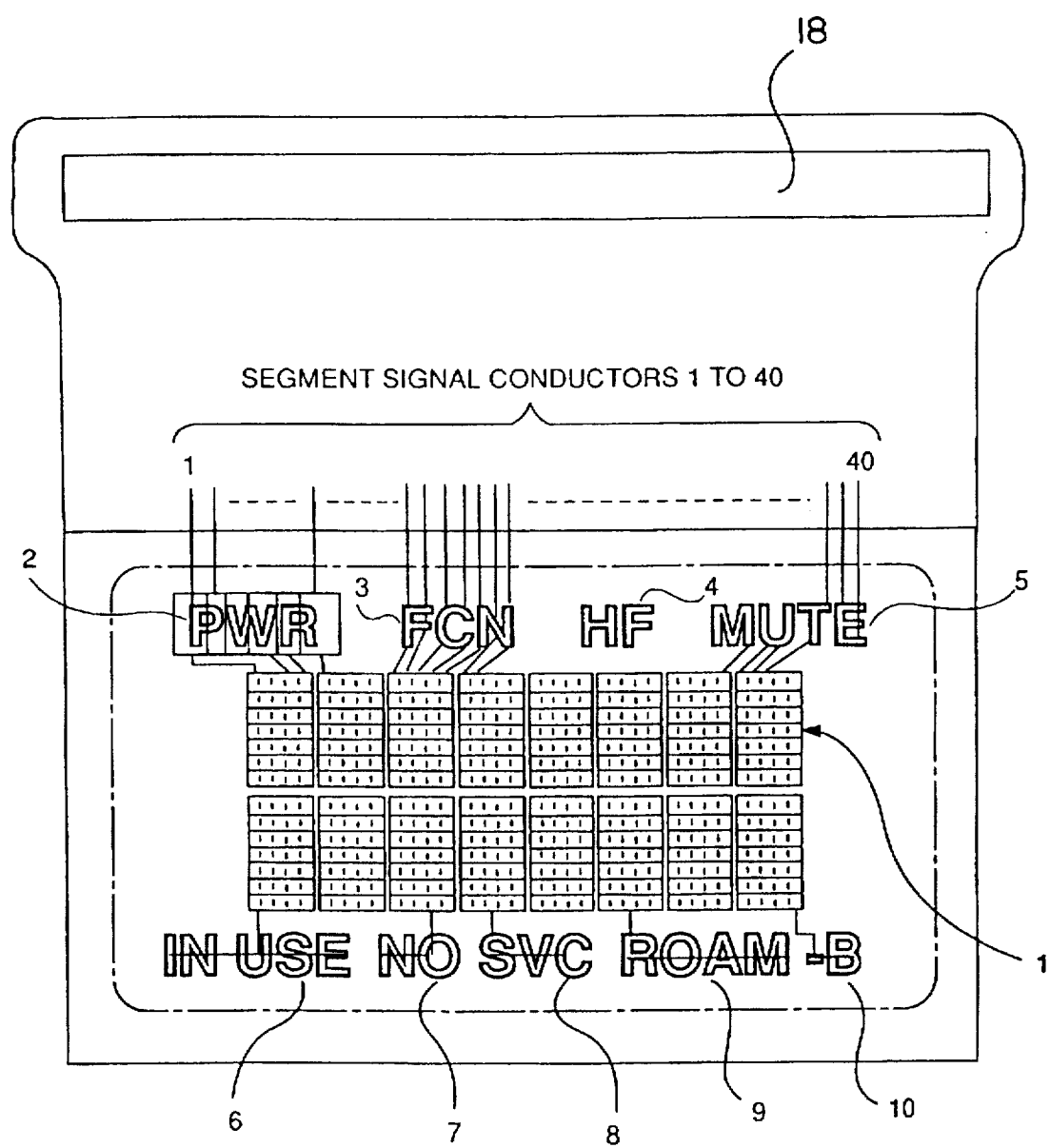
FIG. 1 is a plan view of a wiring of segment signal conductors among signal conductors used in an LCD unit of a first embodiment of the present invention.

An embodiment of the present invention is described referring to drawings.

FIG. 1 to FIG. 4 show the embodiment of the present invention.

The LCD unit of the first embodiment comprises a dot matrix display section 1 for displaying up to 16 characters arranged in 5×7 dot matrix at a center of the display surface and a plurality of pict display sections 2 to 10 for displaying several kinds of alphabetic characters disposed above and below the dot matrix display section 1.

This embodiment has 9 pict display sections for displaying the following characters, each of which is independently illuminated: "PWR" in the pict display section 2, "FCN" in the pict display section 3, "HF" in the pict display section 4, "MUTE" in the pict display section 5, "IN USE" in the pict display section 6, "NO" in the pict display section 7, "SVC" in the pict display section 8, "ROAM" in the pict display section 9 and "-B" in the pict display section 10.

These two types of display sections, that is, the dot matrix display section 1 and the pict display sections 2–10 are connected to the external device from the connection terminal 18 provided on the display unit via a plurality of segment signal conductors and common signal conductors arranged on the display surface for illumination.

Figure 3:
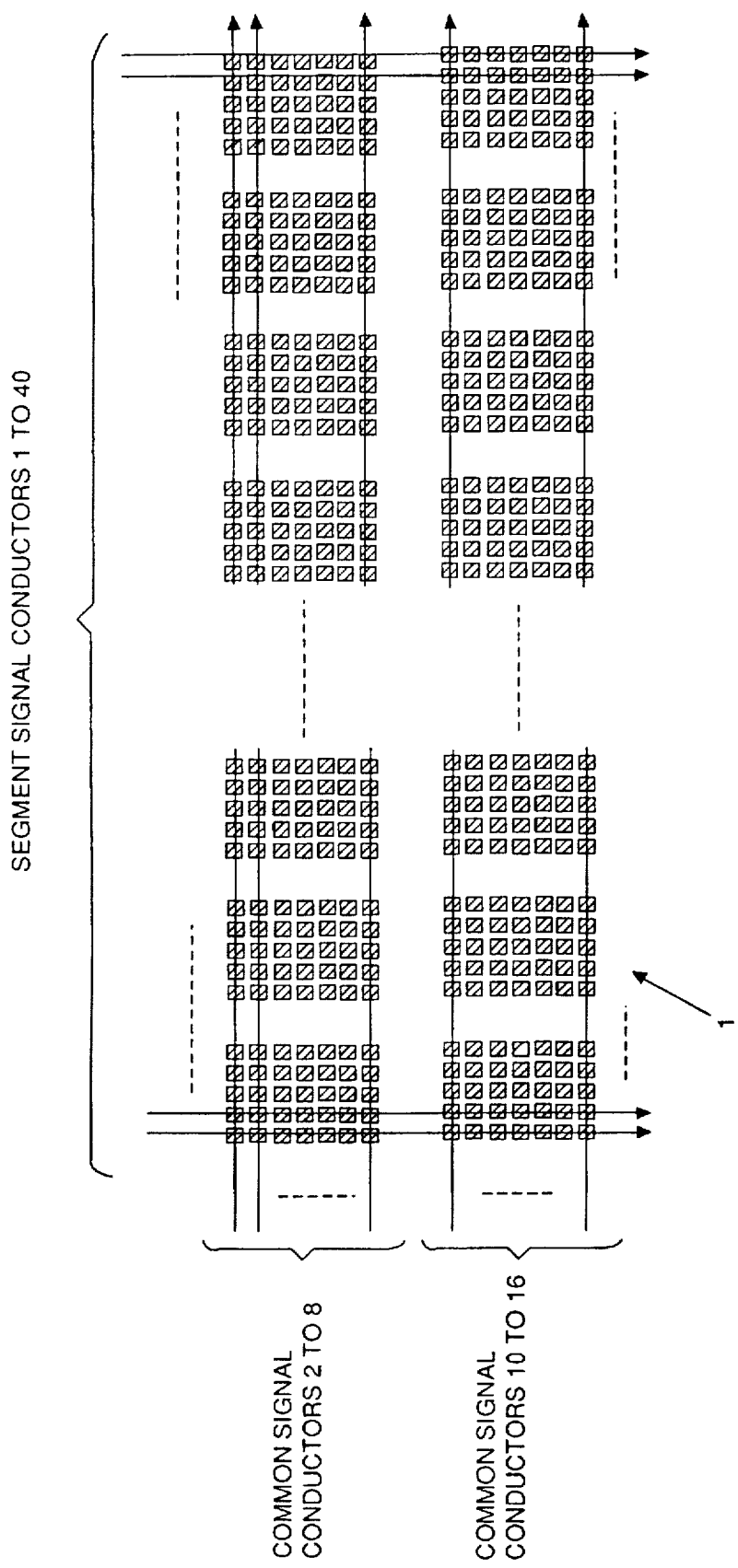
FIG. 3 is a plan view of the signal wiring of a dot matrix display section 1 of the first embodiment.

FIG. 3 shows a signal wiring of the dot matrix display section 1. Each one end of 40 column electrodes (signal electrode) is connected to each of the segment signal conductors 1 to 40, respectively. Each one end of 14 row electrodes (scan electrode) is connected to each of the common signal conductors 2 to 8 and 10 to 16, respectively. The other end of each signal conductor is connected to the connection terminal 18.

The dot matrix display section 1 selectively impresses the row electrode and column electrode via an arbitrary segment signal conductor selected from 1 to 40 and an arbitrary common signal conductor selected from 2 to 8 and 10 to 16 and impresses picture elements as the intersections of both electrodes, thus providing various kinds of display.

The pict display sections 6 to 10, that are disposed below the dot matrix display section 1, for displaying "IN USE", "NO", "SVC", "ROAM" and "-B" are connected to each of 5 segment signal conductors extending from the dot matrix display section 1 (segment signal conductors 1, 14, 18, 28 and 40, in this embodiment) as well as connected to the common signal conductor 1 shown in FIGS. 1 and 2 in the same manner as the conventional art.

Figure 4:
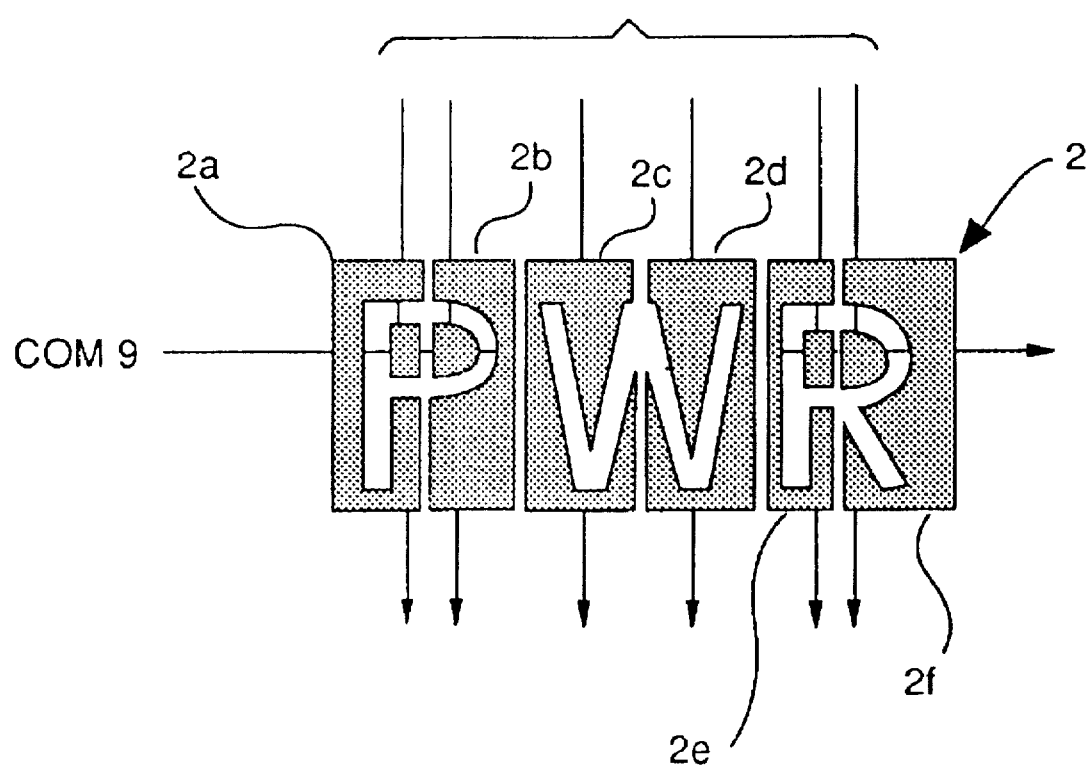
FIG. 4 is a plan view of a construction and signal wiring of the pict display section of the first embodiment.

While the pict display sections 2 to 5, that are disposed above the dot matrix display section 1, i.e., between the dot matrix display section 1 and the connection terminal 18, for displaying "PWR", "FCN", "HF" and "MUTE" are divided into a plurality of cells which are electrically independent from each other, along the segment signal conductors 1 to 40, as shown in FIG. 1 and FIG. 4.

Each divided cell is connected partially to the segment signal conductor of the dot matrix display section 1 and the common signal conductor 9.

FIG. 4 shows the display section of "PWR" which is divided into 6 parts. The pict display section 2 is divided into 6 cells, 2a to 2f. Segment signal conductors 1 to 6 among the segment signal conductors 1 to 40 and the common signal conductor 1, that is, the segment signal conductors 1, 2, 3, 4, 5 and 6 are connected to the cells 2a, 2b, 2c, 2d, 2e and 2f, respectively. And each cell is connected to the common signal conductor 9.

By impressing the segment signal conductors 1 to 6 and the common signal conductor 9, all the cells 2a to 2f are impressed for illuminating the "PWR" of the pict display section 2a.

Figure 2:
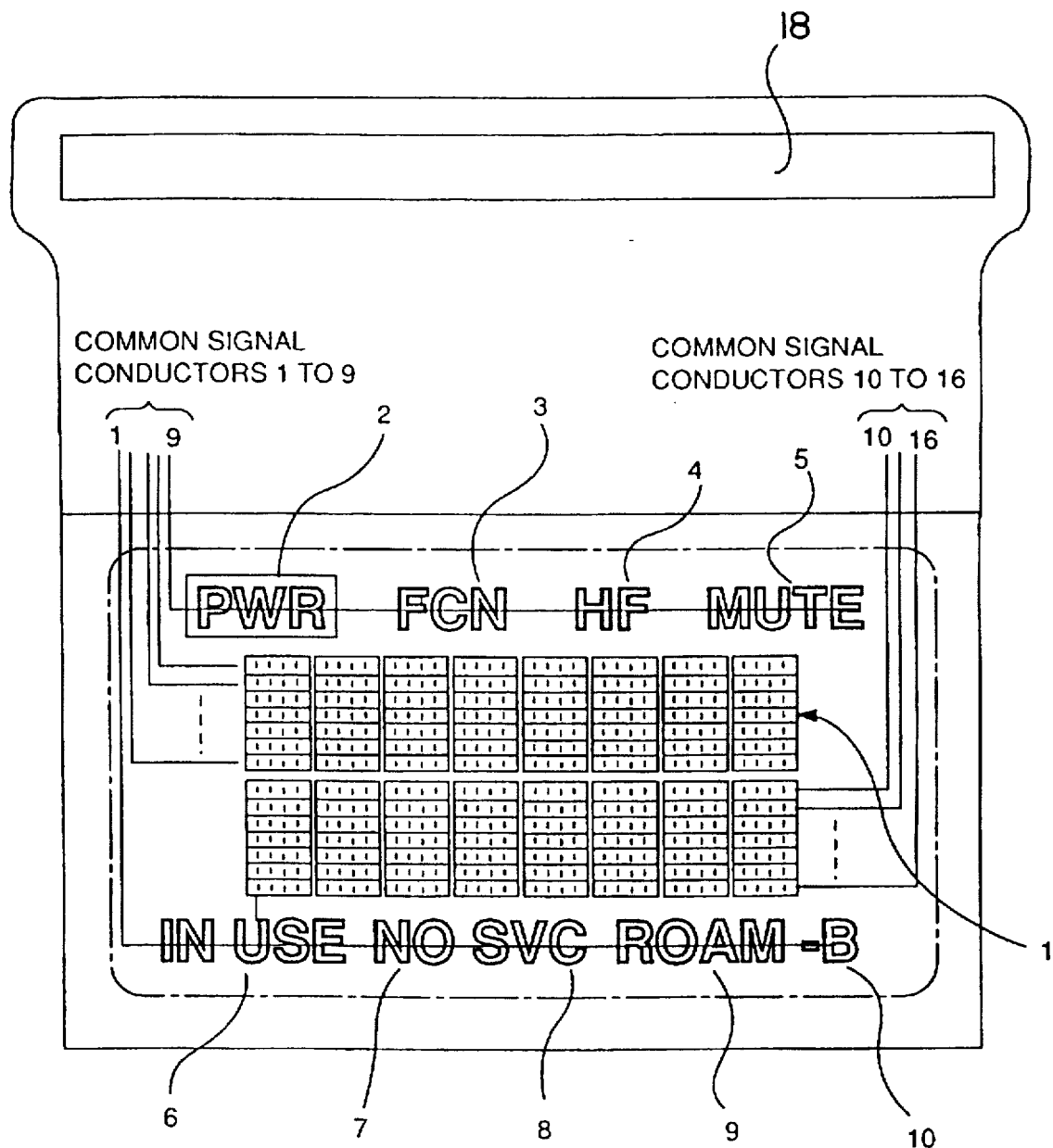
FIG. 2 is a plan view of a wiring of common signal conductors among signal conductors used in the LCD unit of the first embodiment.

FIGS. 1 and 2 show the signal conductor wiring of the LCD unit of the present invention. FIG. 1 shows all wiring of the segment signal conductors. FIG. 2 shows all wiring of the common signal conductors. Some of the segment signal conductors 1 to 40 connected to the connection terminal 18, the segment signal conductors 1 to 6, for example, are connected to column electrodes of the dot matrix display section 1 via the divided cells 2a to 2f of the pict display section 2. The rest of the segment signal conductors are directly connected to the dot matrix display section 1.

In this case, the signal conductors connected via the pict display section 2 is connectable to the dot matrix display section 1 without bypassing the pict display section 2. Therefore these signal conductors can be aligned at a predetermined space as effective as direct connection to the dot matrix display section 1 without the pict display section 2.

FIG. 2 shows the wiring of the common signal conductors 1 to 16. The common signal conductor 1 is connected to and shared by 5 pict display sections 6 to 10 disposed below the dot matrix display section 1. The common signal conductor 9 is connected to and shared by 4 pict display sections 2 to 5 disposed above the dot matrix display section 1. The rest of the common signal conductors 2 to 8 and 10 to 16 are connected to 14 row electrodes of the dot matrix display section 1, respectively.

With the wiring of the segment signal conductors 1 to 40 and the common signal conductors 1 to 16, the dot matrix display section 1 and the pict display sections 2 to 10 are illuminated as described below.

Incoming display signals representing characters and diagrams sent from the external device are supplied to the selected segment and common signal conductors via the connection terminal 18, impressing the row and column electrodes of the dot matrix display section 1 and the pict display sections 2 to 10.

Being impressed, the selected row and column electrodes of the dot matrix display section 1 serve to impress picture elements as intersection of the electrodes, thus effecting to display.

When the row electrode of the pict display section 2 is impressed through the common signal conductor 1 or 9 and the segment signal conductor connected to any of the pict display section 2 is impressed, the selected pict display section effects display.

For the upper pict display sections 2 to 10, all,the segment signal conductors connected to the divided cells of the selected display sections may be supplied with signals.

Next, a second embodiment is described.

In the second embodiment, the pict display sections are arranged on the common signal conductors.

FIG. 5 to FIG. 8 show the second embodiment of the present invention.

The LCD unit of the second embodiment comprises a dot matrix display section 1 for displaying up to 16 characters arranged in 5×7 dot matrix at a center of the display surface and a pict display section 11 arranged at left side of the dot matrix display section 1, a pict display section 12 arranged at right side of the dot matrix display section 1 and pict display sections 13 to 17 under the dot matrix display section 1.

This embodiment has 7 pict display sections for displaying the following characters, each of which is independently illuminated: "HF" in the pict display section 11, "MU" in the pict display section 12, "IN USE" in the pict display section 13, "NO" in the pict display section 14, "SVC" in the pict display section 15, "ROAM" in the pict display section 16, "-B" in the pict display section 17.

These two types of display sections, that is, the dot matrix display section 1 and the pict display sections 11 to 17 are connected to an external device from the connection terminal 19 provided on the display unit via a plurality of segment signal conductors and common signal conductors arranged on the display surface for illumination.

Figure 7:
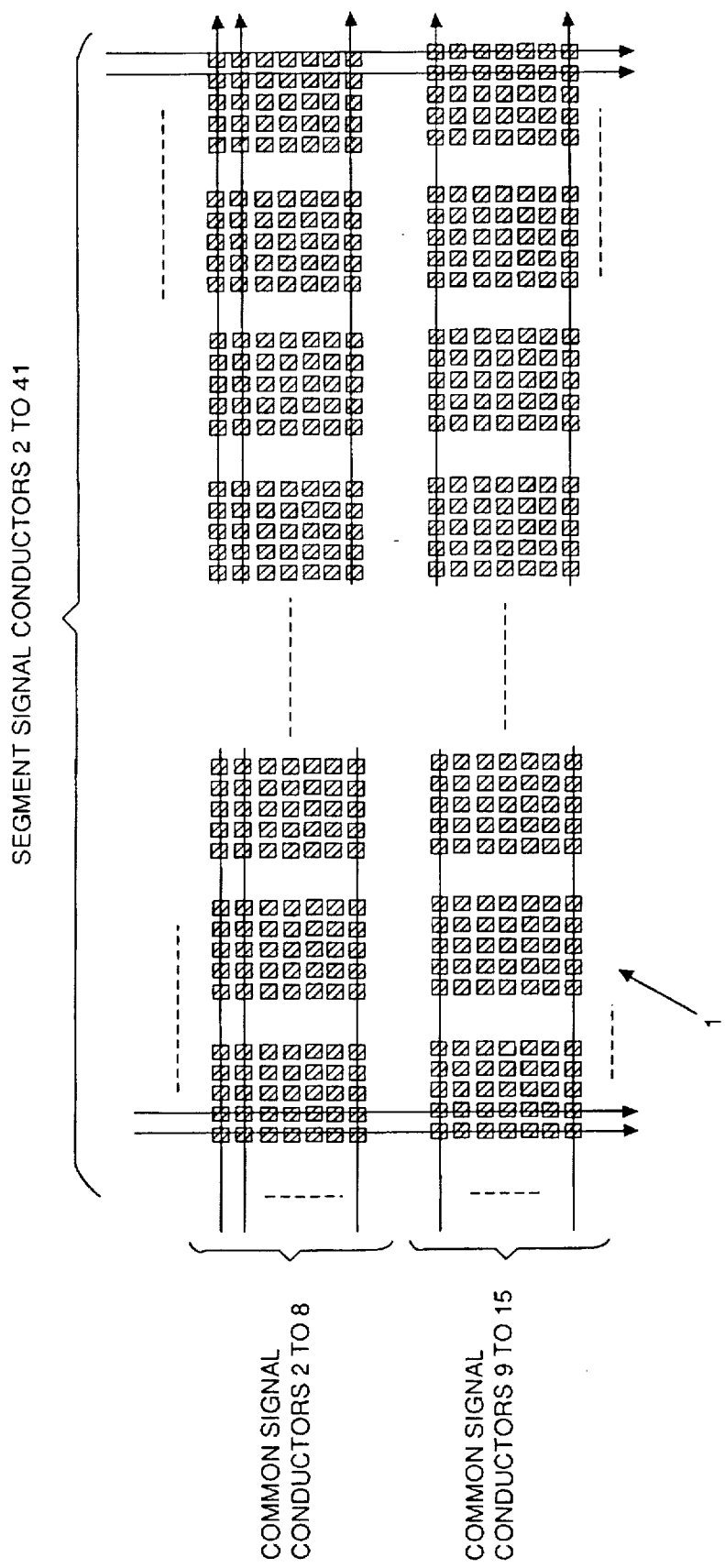
FIG. 7 is a plan view of the signal wiring of a dot matrix display section 1 of the second embodiment.

FIG. 7 shows a signal wiring of the dot matrix display section 1. Each one end of 40 column electrodes (signal electrode) is connected to each of the segment signal conductors 2 to 41, respectively. Each one end of 14 row electrodes (scan electrode) is connected to each of the common signal conductors 2 to 8 and 9 to 15, respectively. The other end of each signal conductor is connected to the connection terminal 19.

The dot matrix display section 1 selectively impresses the row electrode and column electrode via an arbitrary segment signal conductor selected from 2 to 41 and an arbitrary common signal conductor selected from 2 to 8 and 9 to 15 and impresses picture elements as the intersections of both electrodes, thus providing various kinds of display.

The pict display sections 13 to 17, that are disposed below the dot matrix display section 1, for displaying "IN USE", "NO", "SVC" and "-B" are connected to each of 5 segment signal conductors extending from the dot matrix display section 1 (segment signal conductors 2, 15, 19, 29 and 41, in this embodiment) as well as connected to the common signal conductor 1 shown in FIGS. 5 and 6 in the same manner as a conventional art.

Figure 5:
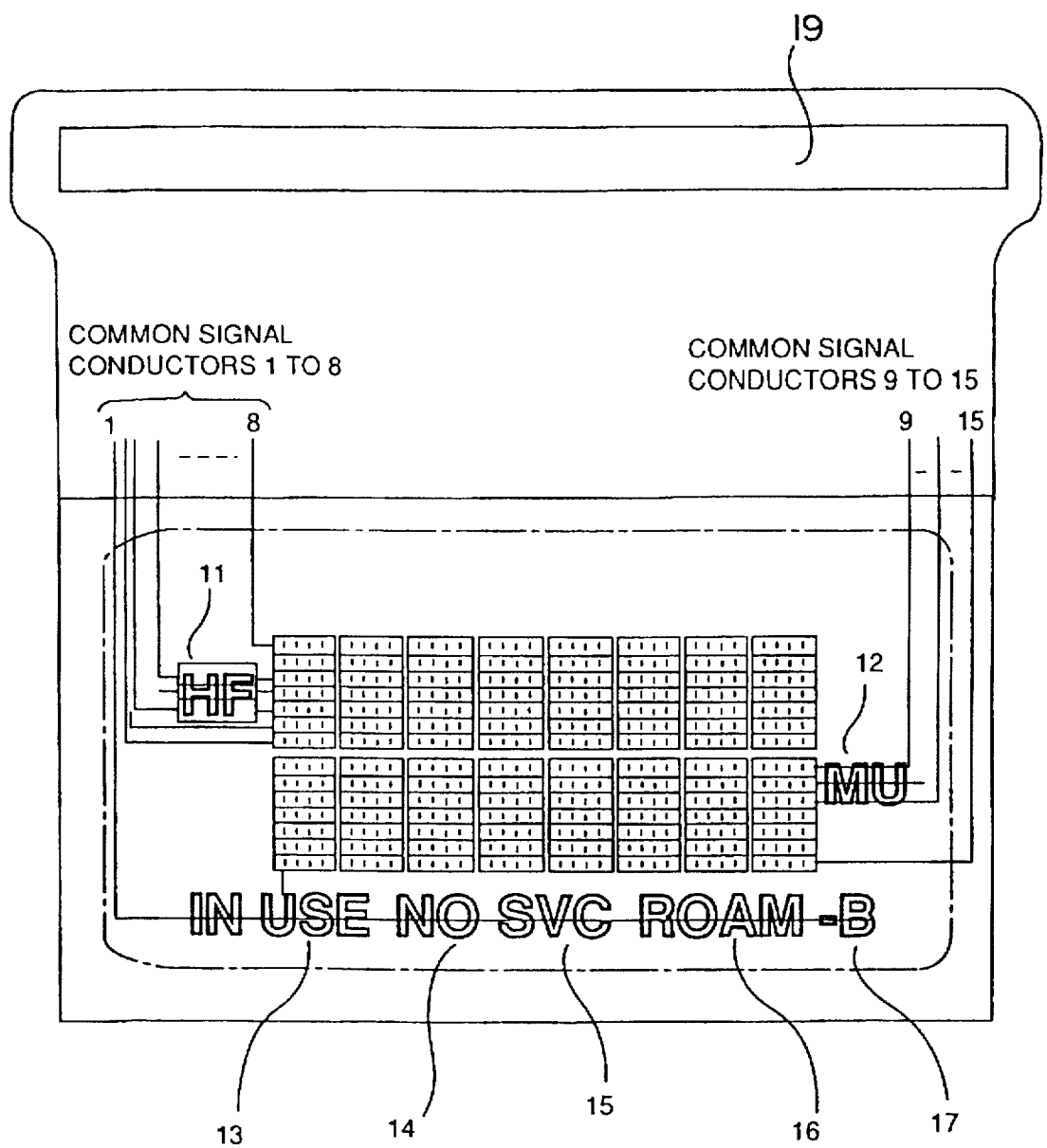
FIG. 5 is a plan view of a wiring of common signal conductors among signal conductors used in an LCD unit of a second embodiment of the present invention.

While the pict display section 11 arranged at left side of the dot matrix display section 1 and the pict display section 12 arranged at right side of the dot matrix display section 1 are electrically independent divided cells and disposed along the common signal conductors 1 to 8 as shown in FIG. 5.

The cells of the pict display section 11 are connected with the common signal conductors 4 to 6 and the segment signal conductor 1, and the cells of the pict display section 12 are connected with the common signal conductors 9 to 11 and the segment signal conductor 42.

Figure 8:
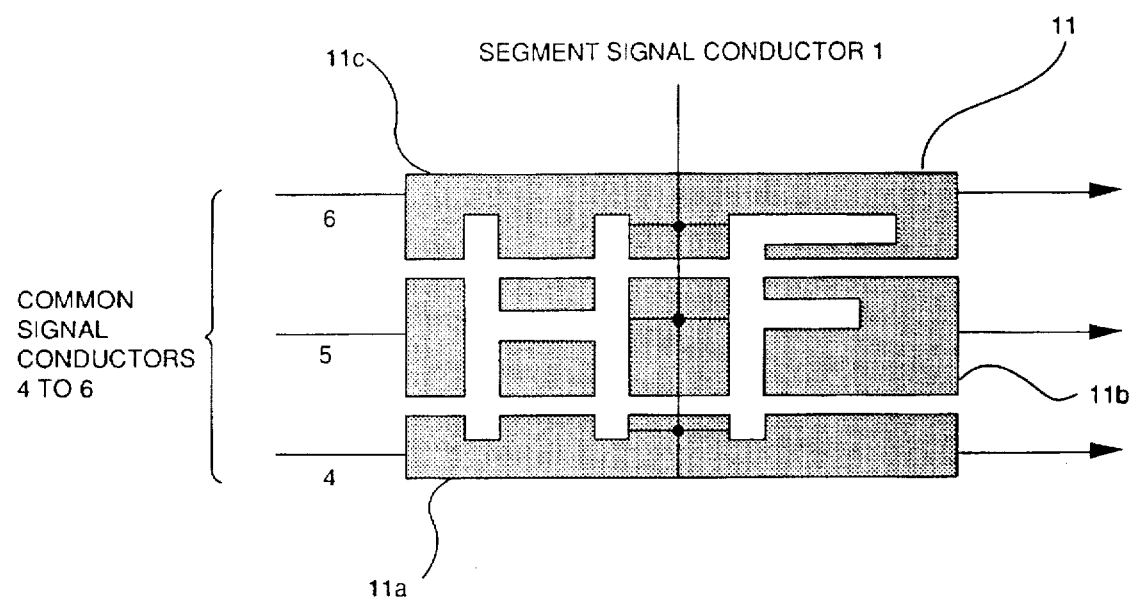
FIG. 8 is a plan view of a construction and signal wiring of the pict display section of the second embodiment.
Figure 9:
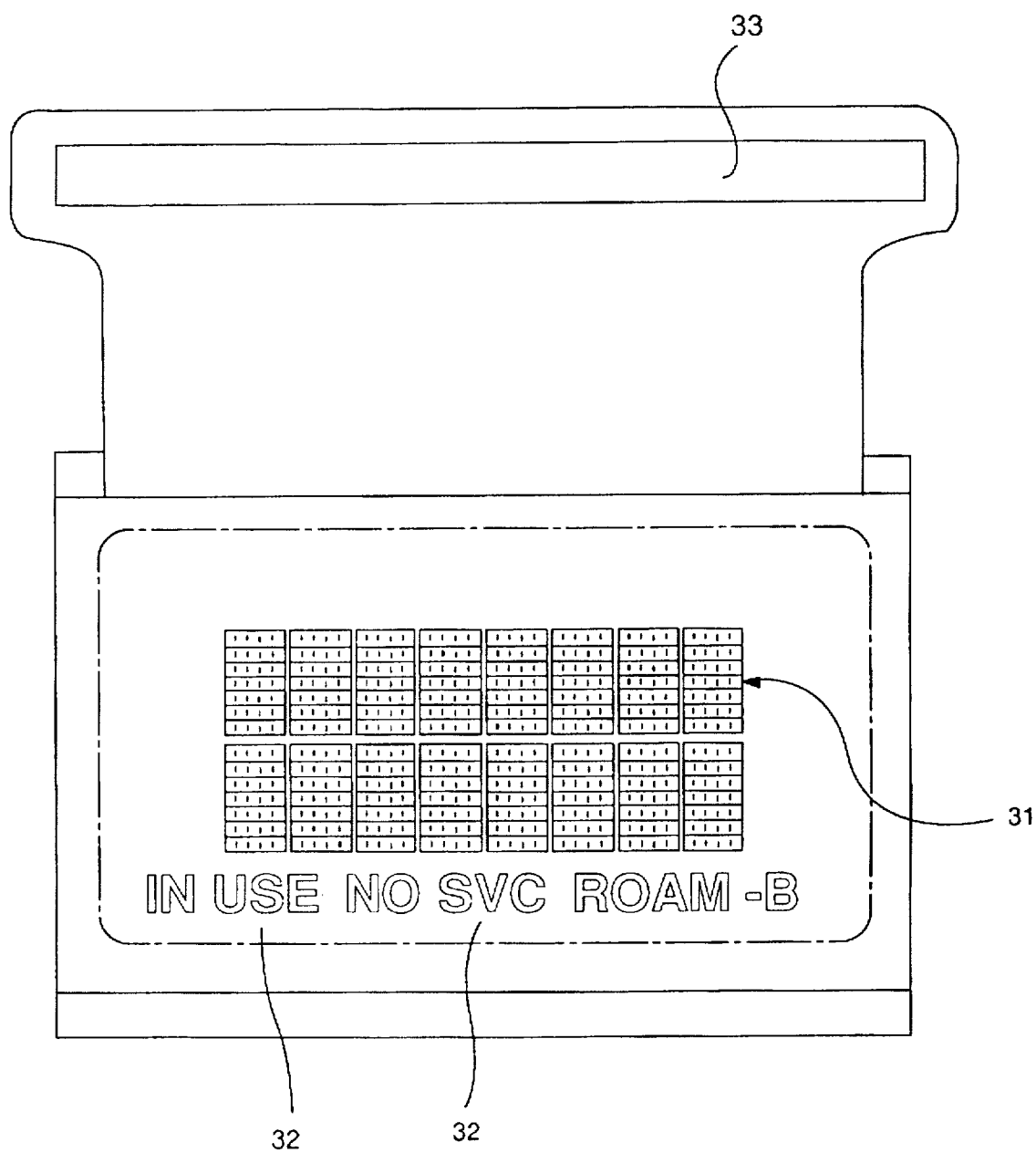
FIG. 9 is a plan view of an example of a conventional LCD unit.
Figure 10:
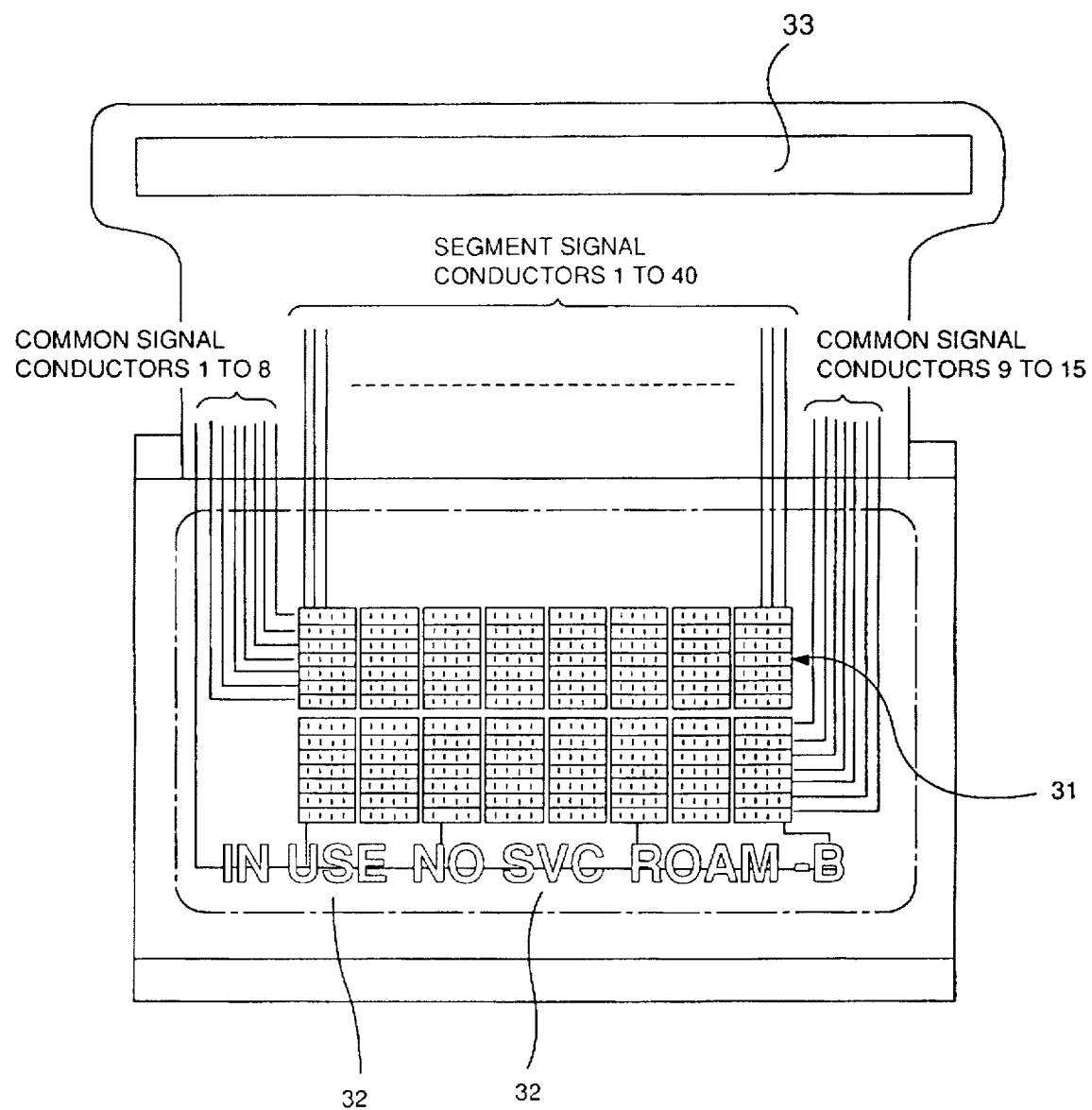
FIG. 10 is a plan view of a wiring condition of the signal conductors.
Figure 11:
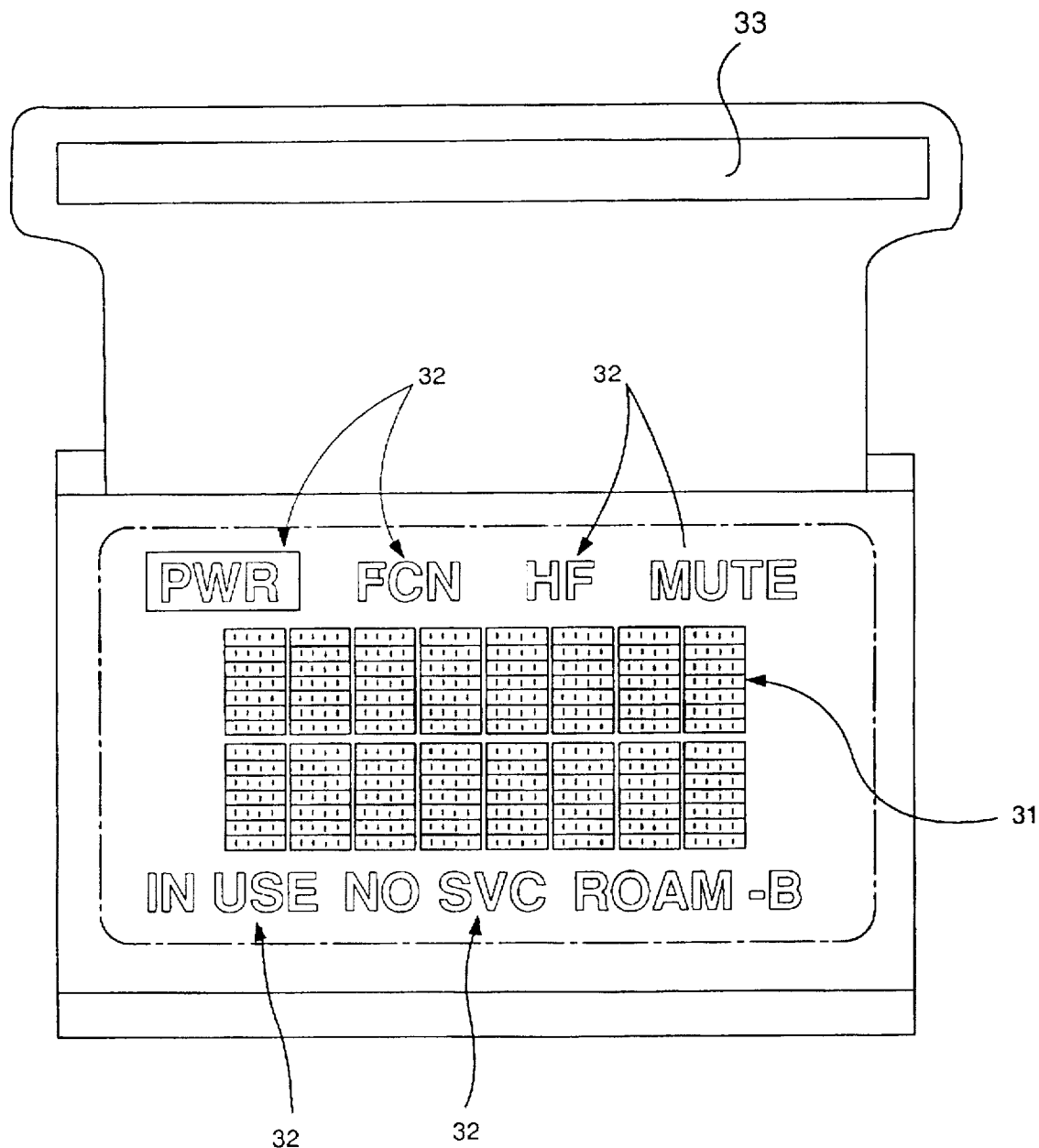
FIG. 11 is a plan view of the LCD unit comprising pict display sections above the dot matrix display section.
Figure 12:
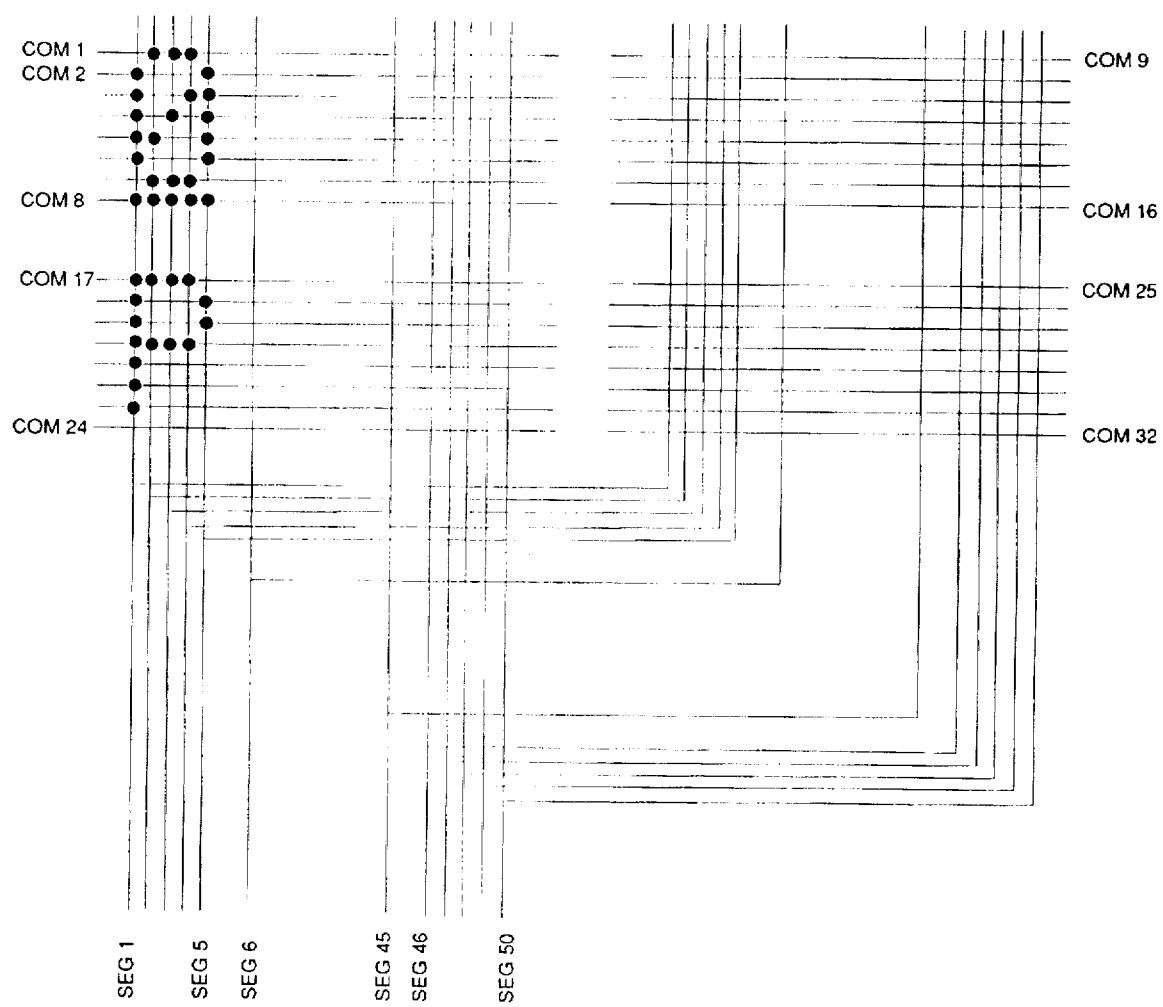
FIG. 12 is a plan view of a conventional LCD unit.

FIG. 8 shows the display section 11 ("HF") which is divided into 3 parts. The pict display section 11 is divided into 3 cells, 11a to 11c and connected with common signal conductors 4 to 6 among the common signal conductors 1 to 15 and the segment signal conductor 1. That is, the common signal conductors 4, 5 and 6 are connected to the cells 11a, 11b and 11c, respectively. And each cell is connected to the segment signal conductor 1.

By impressing the segment signal conductor 1 and the common signal conductors 4 to 6, all the cells 11a to 11c are impressed for illuminating "HF" of the pict display section 11.

Figure 6:
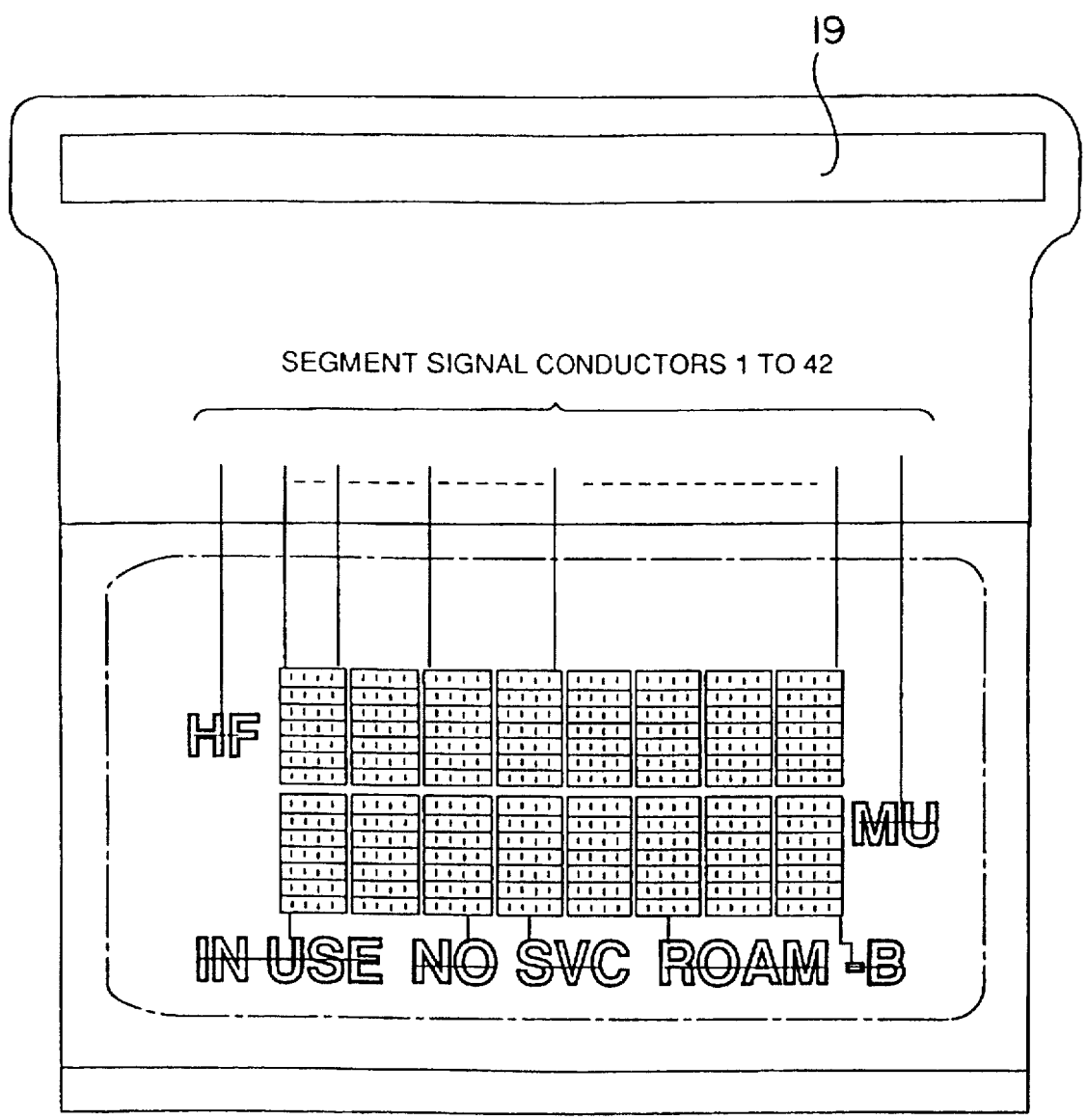
FIG. 6 is a plan view of a wiring of segment signal conductors among signal conductors used in the LCD unit of the second embodiment.

FIGS. 5 and 6 show the signal conductor wiring of the LCD unit of the second embodiment. FIG. 5 shows all wiring of the common signal conductors. FIG. 6 shows all wiring of the segment signal conductors.

Some of the common signal conductors 2 to 8 and 9 to 15 connected to the connection terminal 19 are connected to column electrodes of the dot matrix display section 1 via the divided cells of the pict display sections 11 and 12, as shown in FIG. 5. The common signal conductor 1 is connected to the pict display sections 13 to 17, as a common signal conductor.

In this case, the signal conductors connected via the pict display sections 11 and 12 are connectable to the dot matrix display section 1 without bypassing the pict display sections. Therefore these signal conductors can be aligned at a predetermined space as effective as direct connection to the dot matrix display section 1 without the pict display sections.

FIG. 6 shows wiring of the segment signal conductors 1 to 42. The segment signal conductor 1 is connected to as a signal conductor of the pict display section 11, and the segment signal conductor 42 is connected to as a signal conductor of the pict display section 12. The rest of the segment signal conductors 2 to 41 are connected to 14 row electrodes of the dot matrix display section 1, respectively.

With the wiring of the above segment signal conductors 1 to 42 and the common signal conductors 1 to 15, the dot matrix display section 1 and the pict display sections 11 to 17 are illuminated as described below.

Incoming display signals representing characters and diagrams sent from the external device are supplied to the selected segment and common signal conductors via the connection terminal 19, impressing the row and column electrodes of the dot matrix display section 1 and the pict display sections 11 to 17.

Being impressed, the selected row and column electrodes of the dot matrix display section 1 serve to impress picture elements as intersection of the electrodes, thus effecting to display.

When the row electrode of the pict display section is impressed through the common signal conductors 4 to 6 or 9 to 11 and the segment signal conductor 1 or the segment signal conductor 42 connected to the pict display section is impressed, the selected pict display section effects display.

While the preferred form of the present invention has ben described, it is obvious that various modifications and changes will be apparent without departing from the scope and spirit of the invention.

What is claimed is:

1. A liquid crystal display unit having a dot matrix display section, a pict display section arranged at a different portion from said dot matrix display section and a connection terminal for connecting signal conductors from said dot matrix display section with an external device, said liquid crystal display unit comprising said pict display section divided into a plurality of cells, wherein said signal conductors are connected with said connection terminal via each of said cells.

2. The liquid crystal display unit of claim 1, comprising said pict display section divided into a plurality of cells arranged along said signal conductors.

3. The liquid crystal display unit of claim 1, wherein said signal conductors are segment signal conductors from said dot matrix display section.

4. The liquid crystal display unit of claim 1, wherein said signal conductors are common signal conductors from said dot matrix display section.

5. The liquid crystal display unit of claim 1, comprising a plurality of pict display sections arranged on signal conductors, each of said pict display sections divided into a plurality of cells, wherein said signal conductors are connected with said connection terminal via each of said cells.

6. The liquid crystal display unit of claim 5, wherein said signal conductors are segment signal conductors from said dot matrix display section.

7. The liquid crystal display unit of claim 5, wherein said signal conductors are common signal conductors from said dot matrix display section.

8. A liquid crystal display unit comprising:

a dot matrix display section;

a plurality of common signal conductors connected with said dot matrix display section;

a plurality of segment signal conductors connected with said dot matrix display section;

a connection terminal for connecting said plurality of common signal conductors and said plurality of segment signal conductors with an external device; and a pict display section arranged on at least one of said segment signal conductors; wherein said pict display section is divided along said segment signal conductors into a plurality of cells and said segment signal conductors are connected with said connection terminal via said each cell.

9. The liquid crystal display unit of claim 8, wherein said each cell is connected via a common signal conductor.

10. A liquid crystal display unit comprising:

a dot matrix display section;

a plurality of common signal conductors connected with said dot matrix display section;

a plurality of segment signal conductors connected with said dot matrix display section;

a connection terminal for connecting said plurality of common signal conductors and said plurality of segment signal conductors with an external device; and a pict display section arranged on at least one of said common signal conductors; wherein said pict display section is divided along said common signal conductors into a plurality of cells and said common signal conductors are connected with said connection terminal via said each cell.

11. The liquid crystal display unit of claim 10, wherein said each cell is connected via a segment signal conductor.

12. A control method of illuminating a predetermined pict display section using a plurality of segment signal conductors and common signal conductors connected with a dot matrix display section in a liquid crystal display unit having a dot matrix display section and a plurality of pict display sections, said control method comprising steps of:

dividing each of said plurality of pict display sections into a plurality of cells and connecting a segment signal conductor with a cell;

connecting all cells with a common signal conductor; and driving cells of a predetermined pict display section by impressing said common signal conductor and all segment signal conductors connected with cells of said predetermined pict display section and illuminating said predetermined pict display section.

13. A control method of illuminating a predetermined pict display section using a plurality of common signal conductors and segment signal conductors connected with a dot matrix display section in a liquid crystal display unit having a dot matrix display section and a plurality of pict display sections, said control method comprising steps of:

dividing each of said plurality of pict display sections into a plurality of cells and connecting a common signal conductor with a cell;

connecting all cells with a segment signal conductor; and driving cells a predetermined pict display section by impressing said segment signal conductor and all common signal conductors connected with cells of said predetermined pict display section and illuminating said predetermined pict display section.

* * * * *